(12) United States Patent
Wang et al.

(10) Patent No.: US 10,137,790 B2
(45) Date of Patent: Nov. 27, 2018

(54) SYSTEM AND METHOD FOR NOISE REDUCTION IN ELECTRIFIED VEHICLE POWERTRAIN WITH MULTI-THREE-PHASE ELECTRIC DRIVE

(71) Applicant: FORD GLOBAL TECHNOLOGIES, LLC, Dearborn, MI (US)

(72) Inventors: Jiyao Wang, Canton, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/435,999

(22) Filed: Feb. 17, 2017

(65) Prior Publication Data
US 2018/0236882 A1    Aug. 23, 2018

(51) Int. Cl.
| | | |
|---|---|---|
| *H02P 4/00* | (2006.01) | |
| *H02P 25/22* | (2006.01) | |
| *B60L 11/18* | (2006.01) | |
| *H02M 7/797* | (2006.01) | |
| *H02P 27/08* | (2006.01) | |

(52) U.S. Cl.
CPC ....... *B60L 11/1803* (2013.01); *B60L 11/1816* (2013.01); *H02M 7/797* (2013.01); *H02P 27/08* (2013.01); *B60L 2210/40* (2013.01)

(58) Field of Classification Search
CPC .. H02P 2/10; H02P 25/22; H02P 27/06; H02P 27/08; H02P 27/085; H02P 2207/06; H02J 7/245; H02M 7/5395
See application file for complete search history.

(56) References Cited

U.S. PATENT DOCUMENTS

| | | | |
|---|---|---|---|
| 6,185,115 B1 * | 2/2001 | Sul ..................... | H02M 5/4585 363/37 |
| 6,392,905 B1 | 5/2002 | Huang et al. | |
| 7,348,757 B2 * | 3/2008 | Takahashi ......... | H02M 7/53873 318/636 |
| 8,248,007 B2 * | 8/2012 | Matsuo ............... | H02P 21/0003 318/400.02 |
| 8,750,009 B2 * | 6/2014 | Furutani ........... | H02M 7/53875 363/132 |
| 9,178,455 B2 * | 11/2015 | Niederer ................. | H02P 6/187 |
| 9,214,882 B2 * | 12/2015 | Niederer ................. | H02P 6/187 |
| 2009/0277704 A1 * | 11/2009 | Yamaguchi ............ | B60K 6/365 180/65.31 |
| 2015/0244301 A1 | 8/2015 | Sato | |
| 2016/0105127 A1 | 4/2016 | Miyake | |

* cited by examiner

*Primary Examiner* — Bentsu Ro
(74) *Attorney, Agent, or Firm* — David Kelley; Brooks Kushman P.C.

(57) ABSTRACT

An electric machine is configured with at least two sets of phase windings. A plurality of power switches is configured to selectively couple voltage terminals to each of the phase windings. A controller is programmed to operate the power switches according to a switching pattern, for each of the sets, updated at intervals defined by a switching frequency such that the switching patterns are different during each one of the intervals.

19 Claims, 7 Drawing Sheets

SYSTEM AND METHOD FOR NOISE REDUCTION IN ELECTRIFIED VEHICLE POWERTRAIN WITH MULTI-THREE-PHASE ELECTRIC DRIVE

TECHNICAL FIELD

This application is generally related to a control system for a multiple inverter system for driving an electric machine in an electrified vehicle.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a three-phase motor that may be powered by three sinusoidal signals each driven with 120-degree phase separation. The traction battery is configured to operate in a particular voltage range and provide a maximum current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication. The battery module provides information for the vehicle control algorithms including battery voltage, battery current, and battery state-of-charge (SOC).

SUMMARY

A vehicle includes an electric machine configured with at least two sets of phase windings. The vehicle further includes a plurality of power switches configured to selectively couple voltage terminals to each of the phase windings. The vehicle further includes a controller programmed to operate the power switches according to a switching pattern, for each of the sets, updated at intervals defined by a switching frequency such that the switching patterns are different during each one of the intervals.

A method for operating an electric machine having at least two sets of phase windings includes operating, by a controller, a plurality of power switches configured to selectively couple voltage terminals to each of the phase windings according to a switching pattern, for each of the sets, updated at intervals defined by a switching frequency such that the switching patterns are different during each one of the intervals.

An electrified powertrain includes an electric machine configured with at least two sets of phase windings. The electrified powertrain further includes a plurality of power switches configured to selectively couple voltage terminals to each of the phase windings. The electrified powertrain further includes a controller programmed to operate the power switches during an interval according to a sequence of space vector modulation states, for each of the sets, that defines a different zero vector pattern for each of the sets during the interval.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
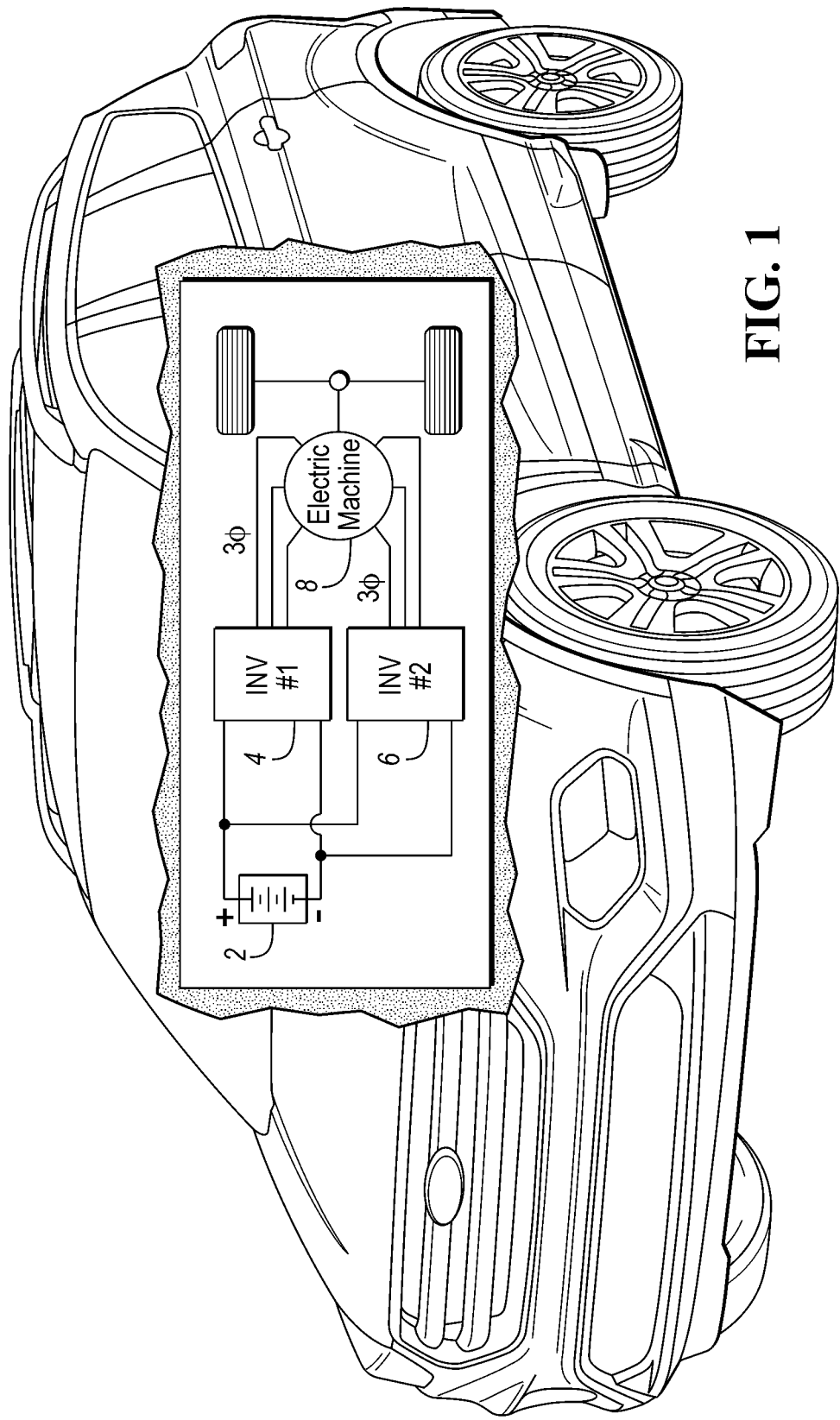
FIG. 1 is a diagram of a six-lead electric drive power by dual power conversion units and an energy storage system.

FIG. 1 depicts a vehicle having an electrified powertrain. The electrified powertrain may include an electric drive 8 that is electrically driven by a first power conversion unit 4 and a second power conversion unit 6 that are electrically coupled to an energy storage unit 2.

A voltage level of the energy storage unit 2 may differ from an input voltage for the power conversion units 4, 6 and a DC-DC converter also referred to as a Variable Voltage Converter (VVC) may be electrically coupled between the power conversion units 4, 6 and the energy storage unit 2. For example, consider an energy storage unit 2 that has a voltage of 200V and an electric drive 8 that requires 120 kW of power to provide propulsion. A power conversion unit input bus may be configured to provide 400V at 300 A or 200V at 600 A to produce the required 120 kW electric drive power. An electric drive unit 8 may be configured to accommodate different input voltages at which to operate. However, the choice of which input voltage to select may be limited by power electronics devices of the power conversion units 4, 6. For example, if a 200V energy storage unit 2 is directly connected to a 200V/600 A DC bus, the power switches of the power conversion units 4, 6 have to operate at 200V/600 A. This voltage/current combination may be cost prohibitive as the high current requirement at the lower voltage may not be economical as the power switches with those specifications may be expensive. In comparison, power switches that operate at 400V/300 A may be more cost-effective. To match the 200V input voltage and desired 400V DC bus voltage, a DC/DC converter (e.g., VVC) may be used to boost the voltage from 200V to 400V. The use of the VVC adds extra power switches and inductors to the electrified powertrain, thereby increasing size and cost. In addition, a VVC is typically connected as a cascaded-connection in the power circuit and hence power loss is generated twice during both energy storage unit charging and discharging cycles. This induces extra power loss and reduces vehicle fuel economy.

To reduce cost and improve packaging for the electrified powertrain, it is desirable to eliminate the DC/DC converter (e.g., VVC). However, a practical and economic way to provide the power requirement without having the cost of high current components (e.g., 200V/600 A components for a 120 kW inverter) is needed. One solution is to implement a parallel power conversion module structure that divides the energy storage unit power to sections of an electric machine. The power flows in windings around stator teeth to induce a field within the stator teeth. This electrified powertrain configuration is such that each power conversion module 4,6 is used to focus a field in stator teeth that reside exclusively in a single section of the electric machine. For example, a power conversion module system bifurcates the power to a first and second power conversion module. The first power conversion module 4 only supplies power to windings around stator teeth in a first section of the electric machine, while the second power conversion module 6 only supplies power to windings around stator teeth in a second section of the electric machine. Here, the first section of the electric machine may be a first half of the electric machine, and the second section of the electric machine may be a second half of the electric machine. The sections of the electric machine are defined by a plane that is coincident with an axis of rotation of the electric machine.

Figure 2:
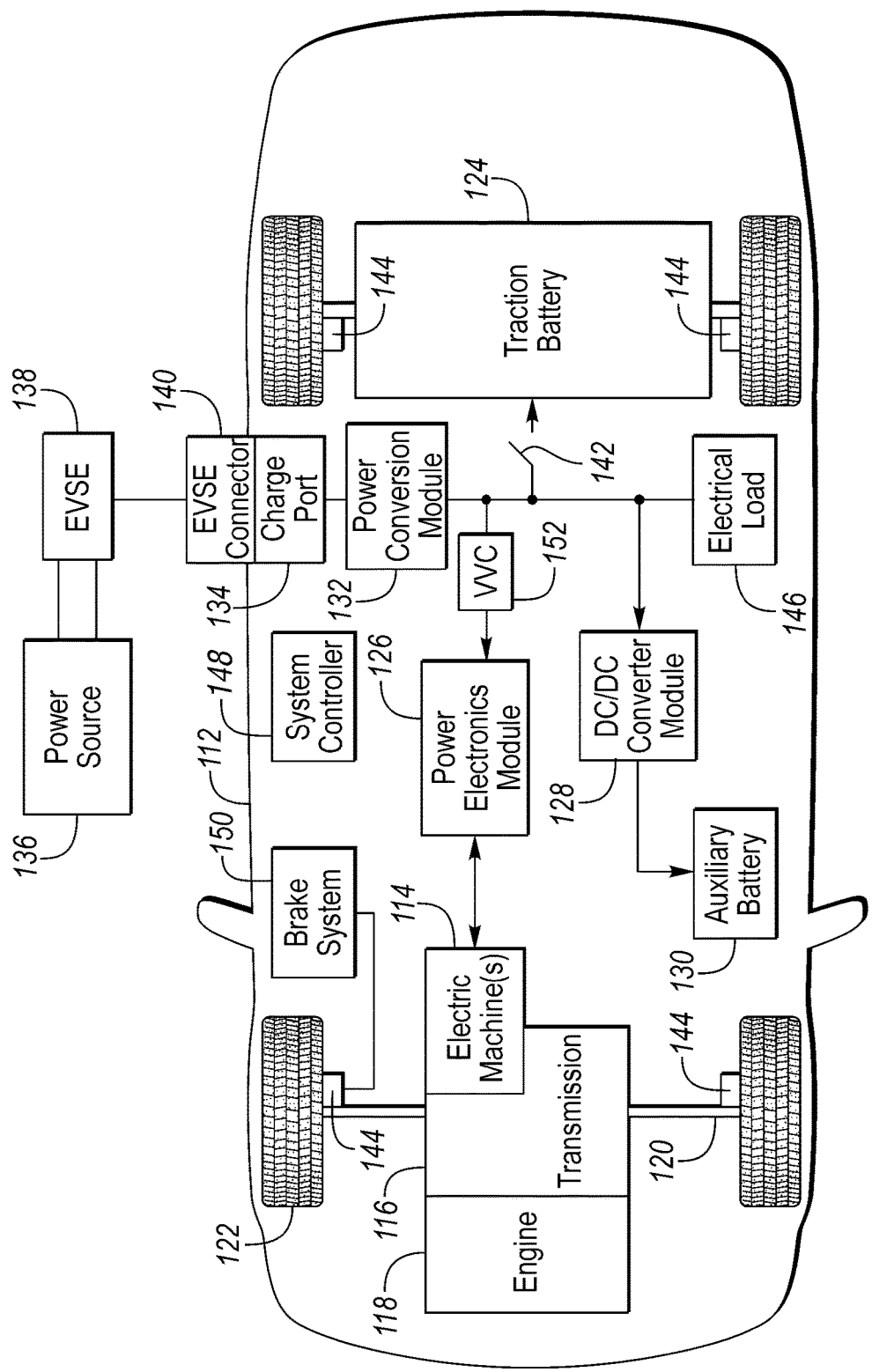
FIG. 2 is a diagram of an electrified vehicle illustrating drivetrain and energy storage components.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The traction battery 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

The VVC 152 may be configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel to the traction battery 124. The input capacitor may stabilize the bus voltage and reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
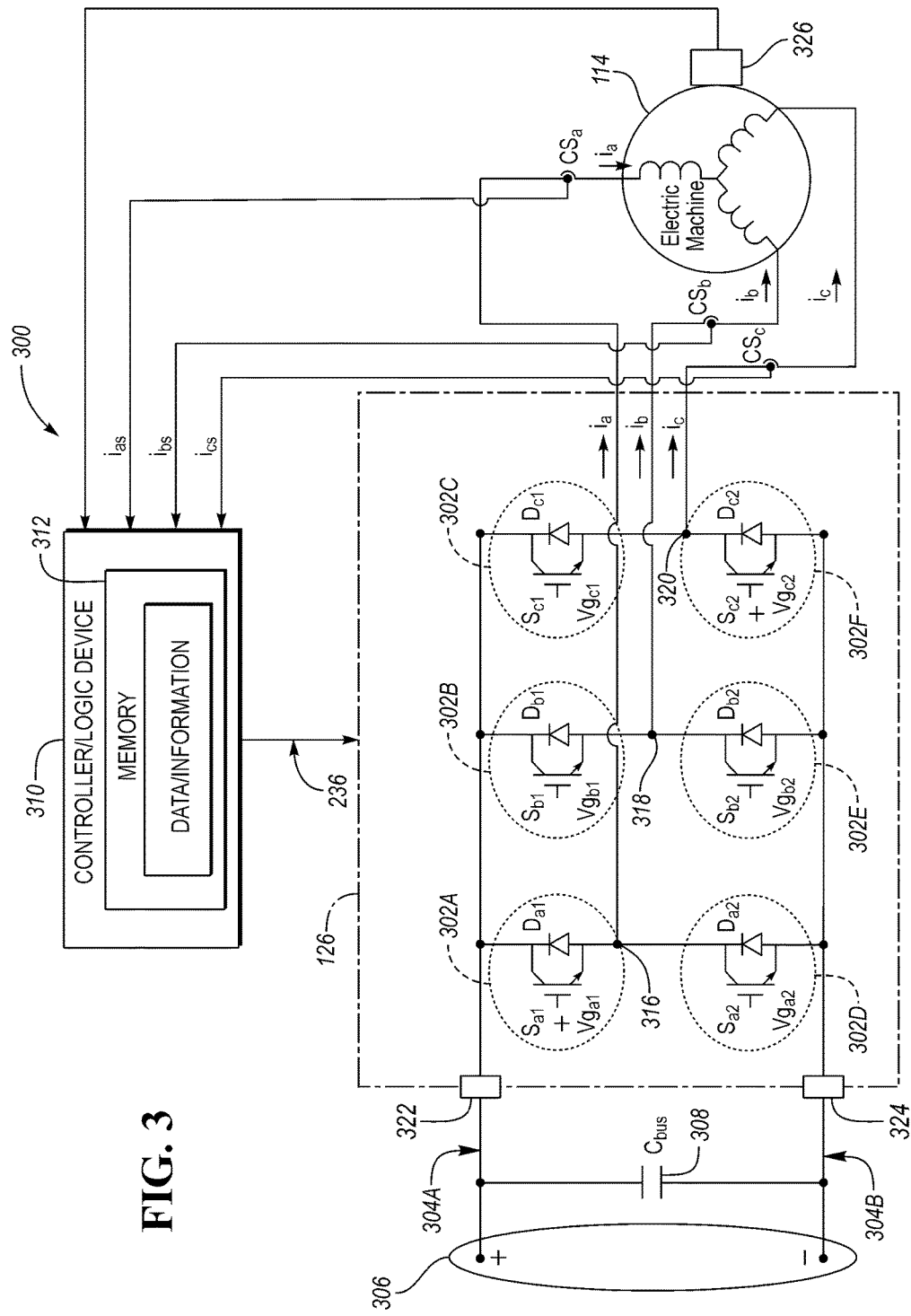
FIG. 3 is a diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The DC bus 304 may include a positive-side conductor 304A and a negative or return-side conductor 304B. The DC bus 304 may be coupled to voltage terminals 322, 324 of the PEM 126. The voltage terminals 322, 324 may provide a connection point between the DC bus 304 and the PEM 126. The positive-side conductor 304A may be coupled to a positive-side voltage terminal 322. The negative-side conductor 304B may be coupled to a negative-side voltage terminal 324. The voltage terminals 322, 324 may be coupled to conductors within the PEM 126 that extend the DC bus 304 within the PEM 126. The AC power is transmitted via the phase currents ia, ib, and ic to drive an AC machine also referred to as an electric machine 114, such as a three-phase permanent-magnet synchronous motor (PMSM) 114 as depicted in FIG. 3. In such an example, the DC power link 306 may be coupled to a DC traction battery 124 to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. The power switches 302 are configured to selectively couple the voltage terminals 322, 324 to each of the phase windings of the electric machine. In one embodiment, each power switch 302 may include a diode and a transistor, (e.g., an insulated-gate bipolar transistor—IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ may be provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on the configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

The system may also include a speed and/or position feedback sensor 326 that is coupled to the electric machine 114. For example, the position feedback sensor 326 may be a resolver that outputs a signal indicative of an angle of rotation. The position feedback sensor 326 may output a signal that is received by the controller 310. The controller 310 may determine from the feedback signal an angle of rotation of the electric machine 114 and a rotational speed of the electric machine 114. The controller 310 may include interface circuitry to process, convert, scale, and/or filter the position feedback signal.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 236 to control the switching pattern of the inverter 126 and therefore the current flow through the respective phase legs 316, 318, and 320. The switching pattern is a set of switching states of the power switches 302 in the inverter. In general, the switching pattern of the inverter 126 determines how the inverter converts power between the DC power link 306 and the electric machine 114.

To control the switching configuration of the inverter 126, the inverter 126 changes the switching state of each power switch 302 in the inverter 126 to either an ON state or an OFF state based on the control signal 236. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3 (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar Junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
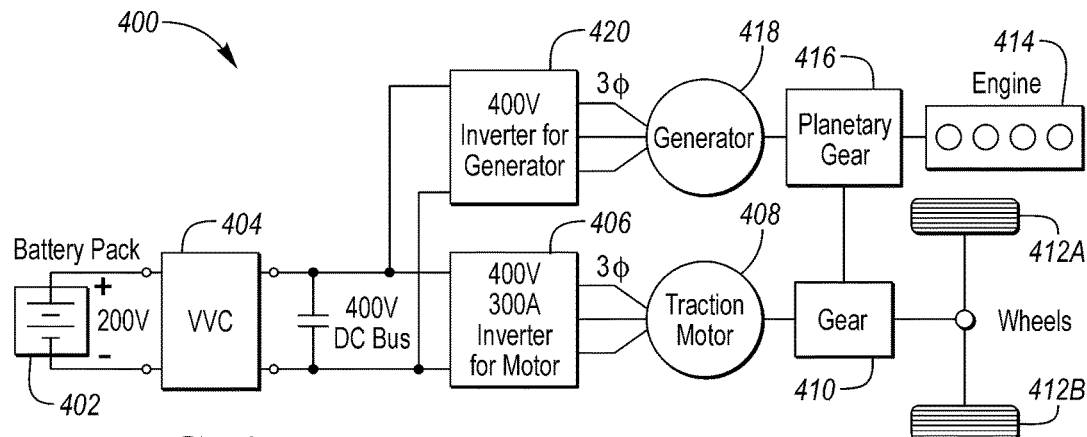
FIG. 4 is a diagram of a hybrid vehicle powertrain including a traction battery and DC-DC converter coupled with a motor via a power inverter.

FIG. 4 is a diagram of a typical hybrid vehicle powertrain 400 including a traction battery 402 and DC-DC converter 404 coupled with a motor 408 via a motor inverter 406. The traction motor 408 is only powered by the single motor inverter 406. The traction motor 408 is coupled with gears 410 and shafts that are configured to provide propulsive force to drive wheels 412A, 412B. Propulsive force is also generated by an internal combustion engine 414 that is coupled with planetary gears 416 and a generator 418. The generator 418 may be used to convert rotational energy into electrical energy typically AC power. The AC power is converted to DC power by a generator inverter 420 that is coupled in parallel with the motor inverter 406. In this system, the inverter power is 120 kW at 400V/300 A. The power path includes two losses in series, a first loss of the DC-DC converter (e.g., VVC) 404 and a second loss of the motor inverter 406.

Figure 5:
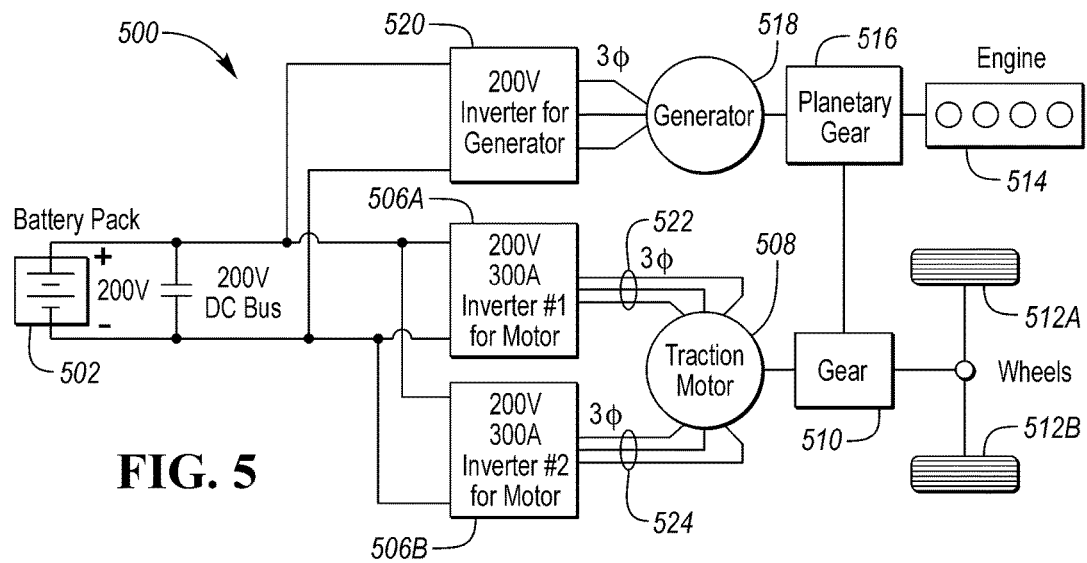
FIG. 5 is diagram of a hybrid vehicle powertrain including a traction battery coupled with a 6-lead motor via dual power inverters.

FIG. 5 is a diagram of an electrified vehicle powertrain 500 including a traction battery 502 coupled with a 6-lead motor 508 via dual power inverters 506A, 506B. Here the motor inverters 506A, 506B are used to independently drive a single traction motor 508. A first 300A inverter 506A drives a first set of phase windings 522. A second 300A inverter 506B drives a second set of phase windings 524. The traction motor 508 is coupled with gears 510 and shafts that are configured to provide propulsive force to drive wheels 512A, 512B. Propulsive force is also generated by an internal combustion engine 514 that is coupled with planetary gears 516 and a generator 518. The generator 518 may be used to convert rotational energy into electrical energy typically AC power. The AC power is converted to DC power by a generator inverter 520 that is coupled in parallel with the motor inverters 506A, 506B. This system may be rated at 120 kW or (200V/300 A)+(200V/300 A), being the sum of power of each motor inverter 506A, 506B. However, as there is no DC-DC converter, there is no DC-DC converter power loss. Further, the power loss of the motor inverter 406 from FIG. 4 is substantially equal to the power loss of the motor inverters 506A, 506B, and in some configurations less due to the lower current flowing through the inverters.

Figure 6:
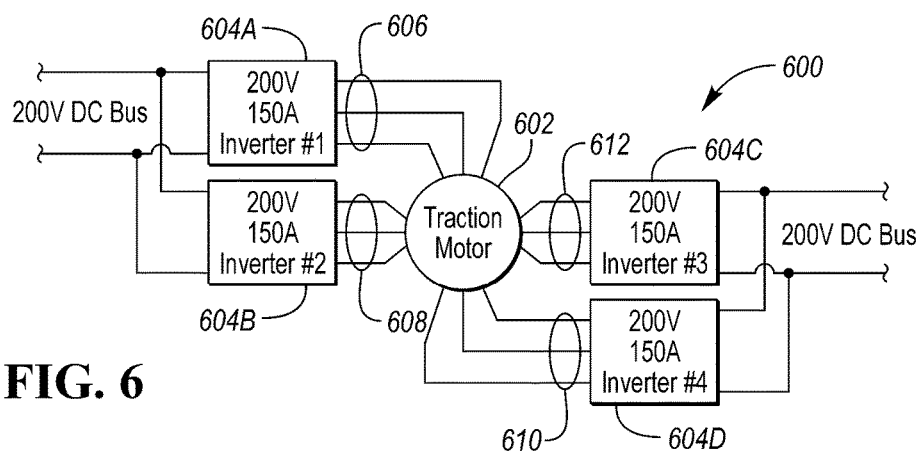
FIG. 6 is a diagram of a hybrid vehicle traction motor coupled with four power inverters.

FIG. 6 is a diagram of a hybrid vehicle system 600 having a traction motor 602 coupled with four power inverters 604A, 604B, 604C, 604D. A first 150A inverter 604A drives a first set of phase windings 606. A second 150A inverter 604B drives a second set of phase windings 608. A third 150A inverter 604C drives a third set of phase windings 612. A fourth 150A inverter 604D drives a fourth set of phase windings 610. Here the available power to drive the electric machine may be increased by increasing a number of inverters used to drive the traction motor. In this system the total power is 120 kW or (200V/150 A)+(200V/150 A)+(200V/150 A)+(200V/150 A), being the sum of power of each motor inverter 604A, 604B, 604C, 604D, however, if motor inverters similar to the motor inverters 506A, 506B were used, the total power would be 240 kW or 4*(200V/300 A).

The controller 310 for the inverter 126 may be programmed to implement a switching control strategy for the power switches 302. Different switching control strategies for operating the power switches 302 are available. The methods may be characterized as PWM switching patterns and non-PWM switching patterns. PWM switching patterns utilize a PWM signal at the gate drives of the power switches 302. Examples of PWM switching patterns includes Space Vector PWM (SVPWM) and Discontinuous PWM (DPWM). Examples of non-PWM switching patterns include Six-Step control and Selected Harmonic Elimination (SHE). The switching strategies have different characteristics with respect to noise and switching losses. In addition, the switching frequency of the control signals may be constrained with some switching strategies. SVPWM may be characterized by low noise but large losses. DPWM switching strategies may be characterized by medium noise and loss levels. Six-Step switching strategies may be characterized by large amounts of noise and small losses. SHE switching strategies may be characterized by low losses and medium loss levels. A typical design goal for an inverter is to minimize both noise and losses to the extent possible. Selection of the switching strategy generally defines the noise and loss characteristics that will be achieved.

In a multi-three-phase (MTP) system that uses multiple inverters to control a single electric machine, there may be flexibility in the selection of the switching strategy for each of the inverters. As discussed, the switching control strategies provide differing levels of compromise between noise and loss levels. In the case of the MTP system, more than one inverter is operating to control the additional phase legs of the electric machine. One choice is to control each set of phase legs with the same control strategy. That is, generate the same switching pattern for each of the sets of phase legs. In this case, any electromagnetic noise generated will be the same for each of the sets of phase legs. To change the noise characteristics, the sets of phase legs may be controlled to achieve the same reference voltage vector but a different switching pattern may be applied. For example, the order of application of the switching states may be reversed for one of the inverters. The result is that the same voltage may be achieved but in a slightly different manner. Rates of change of the current and voltage within each of the intervals may be different between the inverters. This may cause a difference in noise characteristics between each of the inverters. Using a common switching strategy for the inverters constrains the system to accept the constraints inherent with the selected strategy. However, by operating each inverter with a different switching control strategy, the system may achieve improvements in audible noise, current ripple and vibration.

Control strategies that operate each of the inverters in a different manner may reduce noise signatures. In some configurations, each of the inverters may use a SVPWM strategy in which each inverter operates at a different switching frequency. In some configurations, one of the inverters may be controlled using a six-step control strategy, while another of the inverters may be controlled using the SVPWM strategy. In some configurations, the SVPWM controlled inverter may be modified to generate a noise compensation waveform to compensate for noise generated by the six-step controlled inverter. In some configurations, the inverters may be controlled using PWM strategies operating at the same switching frequency. For example, one inverter may operate using the SVPWM strategy while another operates using the DPWM strategy. The result is that each inverter generates a different noise signature that may be spread out over the frequency spectrum at a lower amplitude.

A three-phase AC electric machine is operated by applying a three-phase alternating current to the phase windings. Referring to FIG. 2, the phase legs of an electric machine may be denoted as a, b, and c. The phase currents applied to each of the phase legs may be separated by a 120-degree phase angle difference. For example, each of the alternating phase currents may have the same amplitude but have a phase angle that is offset by plus or minus 120 degrees from the other phase legs.

From a controls prospective, manipulating the three-phase quantities for control purposes is cumbersome. To improve this situation, various methods have been developed to simplify control strategies. Vector control strategies are based on transforming the alternating three-phase signals into a two-dimensional DC signals by using coordinate transformations. A first transformation may be used to transform the three-phase signals into a two-dimensional space. Control operations may be performed in the two-dimensional coordinate system. A second transformation may be used to output the control signals in three-dimensional coordinate system. A reference voltage or current vector for the electric machine may be represented as a two-dimensional vector having an α-axis 702 and a β-axis 704. The two axes define the vector space.

Typical control strategies for electric machines include space vector modulation strategies. Space vector modulation strategies may operate by determining a reference voltage or current vector in the two-dimensional vector space. The reference vector may be computed based on a desired torque and speed of the electric machine. The space vector modulation strategy may operate by defining switching patterns or vectors based on combinations of states of the power switches 302. Within the two dimensional-space, certain vectors may be defined corresponding to various combinations of switching states of the power switches 302.

Figure 7:
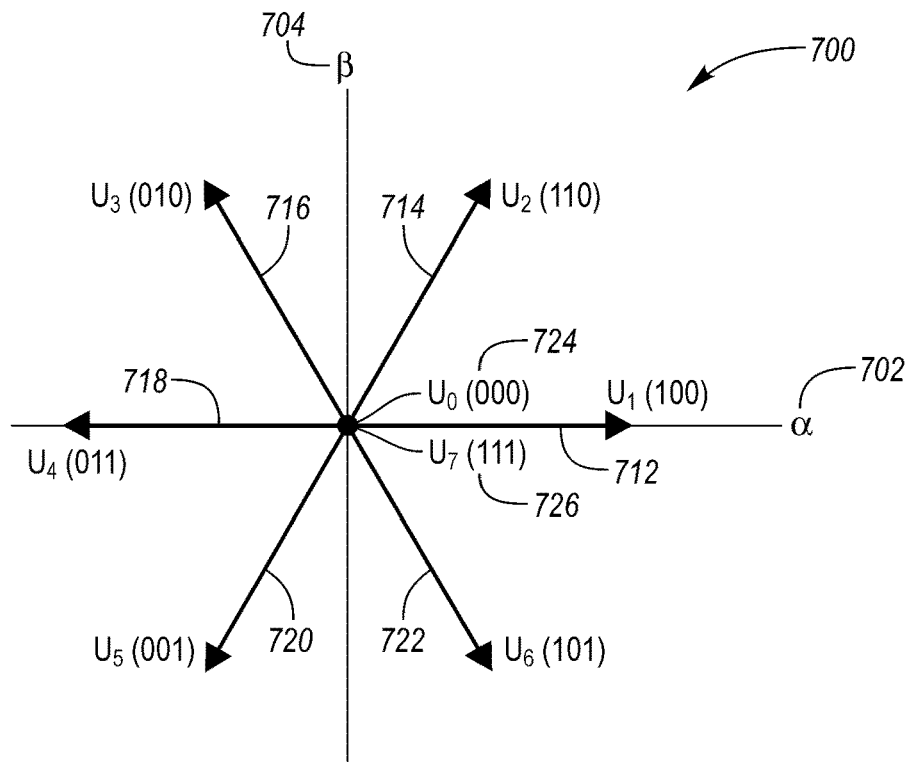
FIG. 7 is a diagram of a vector space utilized for electric machine control.

Vectors representing particular switching states may be represented in the vector space 700 as depicted in FIG. 7. For example, a first vector, $u_1$, 712 may be represented along the α-axis 702. The first vector 712, may be further represented by a switching state denoted as (100). The three coordinates in parenthesis identify an associated state of the power switches 302 for each phase leg. Each of the coordinates corresponds to a different phase leg. The first coordinate corresponds to the first phase leg ("a") and indicates a state of power switches 302A and 302D. The second coordinate corresponds to the second phase leg ("b") and indicates a state of power switches 302B and 302E. The third coordinate corresponds to the third phase leg ("c") and indicates a state of power switches 302C and 302F. A coordinate value of "1" indicates that the power switches are operated to connect the associated phase leg to the positive-side voltage terminal 322 that is coupled to the DC bus 304. For example, for the first phase leg ("a"), power switch 302A may be operated in the ON state and power switch 302D may be operated in the OFF state. A coordinate value of "0" indicates that the power switches are operated to connect the associated phase leg to the negative-side voltage terminal 324 that is coupled to the DC bus 304. For example, for the first phase leg ("a"), power switch 302A may be operated in the OFF state and power switch 302D may be operated in the ON state. The states are defined similarly for the other phase legs ("b" and "c"). Table 1 depicts the switch states for each of the possible coordinates.

TABLE 1

| State | Switch | | | | | |
|-------|------|------|------|------|------|------|
|       | 302A | 302B | 302C | 302D | 302E | 302F |
| (100) | on   | off  | off  | off  | on   | on   |
| (110) | on   | on   | off  | off  | off  | on   |
| (010) | off  | on   | off  | on   | off  | on   |
| (011) | off  | on   | on   | on   | off  | off  |
| (001) | off  | off  | on   | on   | on   | off  |
| (101) | on   | off  | on   | off  | on   | off  |
| (000) | off  | off  | off  | on   | on   | on   |
| (111) | on   | on   | on   | off  | off  | off  |

A second vector, $u_2$ 714 may be defined having a switching state of (110). A third vector, $u_3$, 716 may be defined having a switching state of (010). A fourth vector, $u_4$, 718 may be defined along the negative of the α-axis 702 having a switching state of (011). A fifth vector, $u_5$, 720 may be defined having a switching state of (001). A sixth vector, $u_6$ 722 may be defined having a switching state of (101). The vectors $u_1$ through $u_6$ may be referred to as active vectors. A first zero vector, $u_0$, 724 may be defined having a switching state of (000). A second zero vector, $u_7$, 726 may be defined having a switching state of (111). The first zero vector 724 and the second zero vector 726 have all phase legs/windings coupled to a common DC bus conductor.

Figure 8:
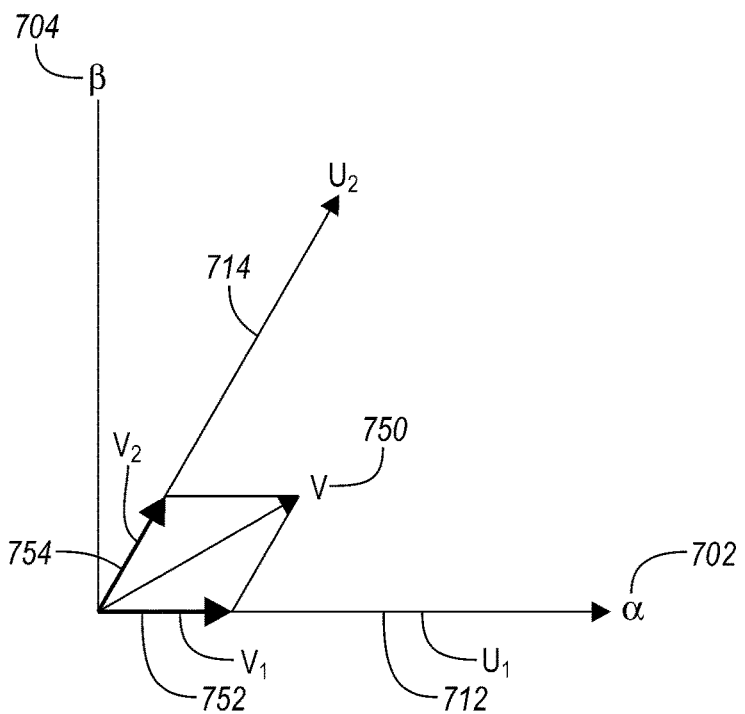
FIG. 8 is a diagram depicting an example of constructing a reference vector using two adjacent predefined vectors.

The reference current/voltage may be represented in the vector space as some combination of the above defined vectors. The reference may be represented as a vector having a magnitude and an angle (relative to the α-axis 702) in the vector space. The reference vector may rotate in the vector space as a function of the rotational speed of the electric machine. The reference vector angle may be a function of the rotational angle of the electric machine. The magnitude of the vector may depend on a torque magnitude. The reference vector may be formed from a combination of the above defined vectors. Knowing the magnitude and angle of the vector allows a combination of the above defined vectors to be determined. FIG. 8 depicts an example of a reference vector, V, 750. The vector, V, 750, may be constructed of a combination of the first active vector, $u_1$, 712 and the second active vector, $u_2$, 714. A vector, $v_1$, 752 may be defined along the first active vector 712 and a vector, $v_2$, 754 may be defined along the second active vector 714. The vector addition of vector $v_1$ 752 and vector $v_2$ 754 results in vector V 750. Note that as the reference vector rotates in the vector space, the reference vector may lie between two different space vectors.

The space vector modulation strategy may select the two closest active vectors to the reference vector. In addition, an amount of time that each of the active vectors is applied is determined. The two closest active vectors may be those active vectors that the reference vector, V, 750 lies between. As the reference vector 750 rotates in the vector space, a different pair of active vectors will be used over the course of a full rotation. The application time for each of the applied vectors may be relative to an interval defined by the switching frequency (e.g., period defined by a predetermined frequency). The switching frequency defines the rate at which the states of the power switches 302 change. A switching period may be defined as the inverse of the switching frequency. The controller 310 may compute the proportion of the switching period that is allocated to each of the active vectors and zero vectors. The proportion of the switching period allocated to each of the active vectors depends on the magnitudes of the reference vector, V, 750, and the magnitudes of the component vectors $v_1$ 752 and $v_2$ 754. The proportion of the switching period allocated to each of the active vectors also depends on the relative angle of the reference vector V 750 within the vector space (e.g., angle between V 750 and the α-axis 702).

Once the application duration for each of the active vectors is computed, any remaining time within the interval may be filled by application of one or both of the zero vectors for the remaining time within the switching period. As a result, the power switches 302 for each leg of the electric machine may be switched on for a time defined by the space vector modulation strategy.

The state of the power switches may be output at each switching period. To achieve vectors of various magnitudes, a combination of active vectors and zero vectors is applied over each of the switching periods. As the magnitude of the reference vector, V, 750 decreases, larger proportions of the switching period may be allocated to the zero vectors. The switching frequency may define the rate at which the switching pattern is output by the inverter. The switching pattern may be updated at the switching frequency. In some configurations, the switching pattern may be updated at an integer multiple of the switching period (e.g., inverse of switching frequency). In such a case, the switching pattern may be changed at the integer multiple and then output over the next integer multiple of switching periods.

For each of the intervals, two or more actives states are applied for the associated application times depending on which vectors ($u_x$ defined above) that the reference vector, V 750, lies between. The active states and zero states may be applied in any order for the corresponding application times to achieve the reference voltage vector 750. In some applications, the pattern of active and zero vectors may be ordered such that only one of the power switches 302 changes at each transition. Such a selection may help to reduce switching losses.

In the MTP system, more than one inverter is operating to control the additional phase legs of the electric machine. For example, referring to FIG. 5, the traction motor 508 is controlled by inverters 506A and 506B. One possible control choice is to control each set of phase winding (sets 522 and 524) with the same control strategy. That is, generate the same switching pattern for each of the sets of phase windings. In this case, any noise generated will be the same for each of the sets of phase windings. To change the noise characteristics, the sets of phase windings may be controlled to achieve the same reference voltage vector but with a different switching pattern applied to each set of phase windings. For example, the order of application of the switching states may be reversed for one of the inverters. The result is that the same voltage may be achieved but in a slightly different manner. Rates of change of the current and voltage within each of the intervals may be slightly different between the inverters. This may cause a difference in noise characteristics between each of the inverters.

A first technique for applying a different switching pattern for each of the sets of windings is to change the order of the switch states between the inverters. To achieve, the same reference vector, the same vectors and application times may be selected. The switching states may be applied differently for each of the inverters over each switching interval. For example, the order of the switching states may be applied in a reversed order from one another. The net effect is to achieve the same reference vector but the switching patterns are different. As such, the audible noise characteristics of each machine will be different. If the same switching pattern is used, the audible noise characteristics would be the same and the effect may be additive. That is, more audible noise may be perceived when the same switching pattern is used. By using the different switching patterns, the noise spectrum may be spread out leading to a lower amplitude of noise.

Figure 9:
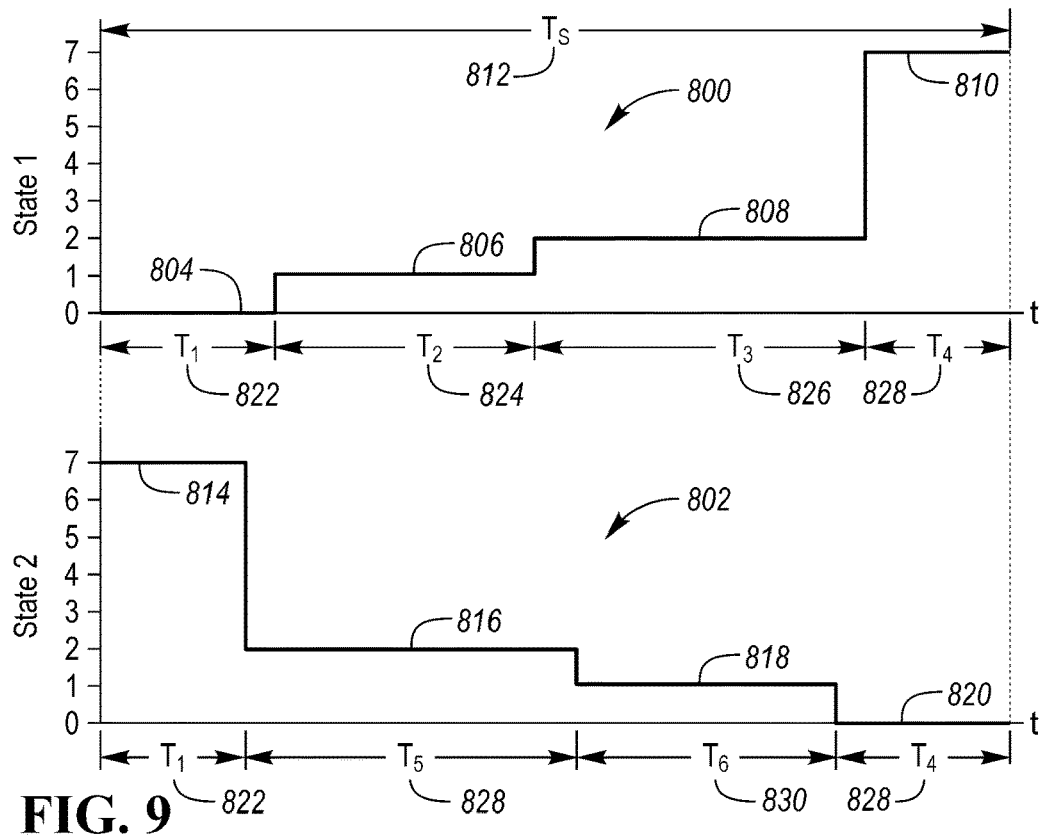
FIG. 9 is an example timing diagram for switching states for two inverters that illustrates using a different switching pattern over a switching interval.

FIG. 9 depicts a possible sequence of switching states within one switching interval in which the sequence of switching states is reversed between two inverters controlling an electric machine with two sets of phase windings (e.g., traction motor 508 of FIG. 5). A first switching pattern 800 may be defined for the first set of windings (e.g., 522 of FIG. 5). For this example, a voltage reference similar to V 750 of FIG. 8 is assumed. The switching states to generate the reference vector, V, 750 include a combination of a first active vector define by $u_1$ 712 and a second active vector defined by $u_2$ 714. In addition, some combination of zero vectors $u_0$ 724 and $u_7$ 726 may be utilized. Over the switching interval 812, the first switching pattern 800 may include a number of states corresponding to the active and zero vectors. In the example, a first zero state 804 is achieved by applying $u_0$ 724 for a duration $T_1$ 822. The first switching pattern 800 then changes to a first active state 806 (achieved by applying vector $u_1$ 712) for a duration of $T_2$ 824. The first switching pattern 800 then changes to a second active state 808 (achieved by applying vector $u_2$ 714) for a duration of $T_3$ 826. The first switching pattern 800 then changes to a second zero state 810 that is achieved by applying zero vector $u_7$ 712 for a duration of $T_4$ 828. Note that the sum of $T_1$ 822, $T_2$ 824, $T_3$ 826, and $T_4$ 828 is equivalent to the switching interval 812.

A second switching pattern 802 may be defined for the second set of windings (e.g., 524 of FIG. 5). Over the switching interval 812, the second switching pattern 802 also includes a number of states corresponding to the active and zero vectors. In the example, a first zero state 814 is achieved by applying vector $u_7$ 726 for the duration $T_1$ 822. The second switching pattern 802 then changes to a first active state 816 (achieved by applying $u_2$ 714) that is applied for a duration of $T_5$ 828. The duration $T_5$ 828 is the same as duration $T_3$ 826. The second switching pattern 802 then changes to a second active state 818 (achieved by applying $u_1$ 712) for the duration of $T_6$ 830. The duration $T_6$ 830 is the same as duration $T_2$ 824. The second switching pattern 802 then changes to a second zero state 820 that is achieved by applying zero vector $u_0$ for the duration of $T_4$ 828.

One difference between the first switching pattern 800 and the second switching pattern 802 is that the zero vectors are applied differently between the patterns. Once the zero vector duration is computed for a switching interval, the controller must determine how to allocate the zero vector duration between the zero vectors. Typical allocations are to divide the zero vector duration to a first interval at the beginning of the switching interval and a second interval at the end of the switching interval. Some control strategies (e.g., DPWM) may allocate the entire zero vector duration to one of the zero vectors.

Figure 10:
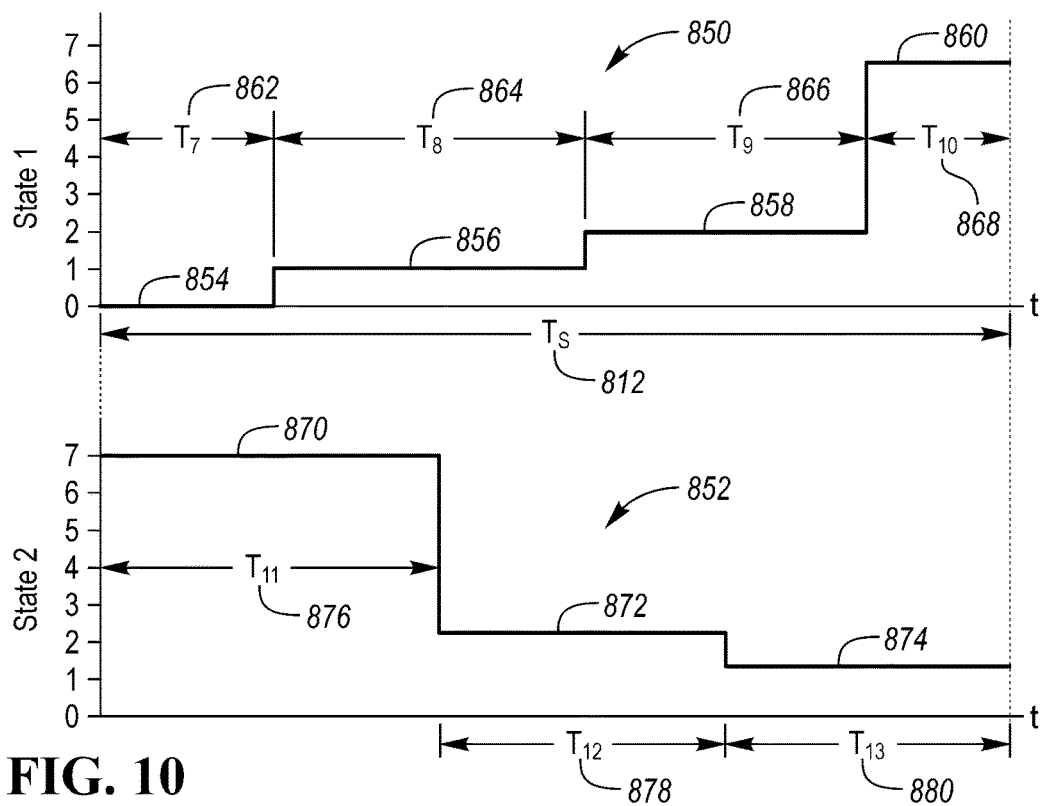
FIG. 10 is an example timing diagram for switching states for two inverters that illustrate using a different number of zero vectors over a switching interval.

FIG. 10 depicts another example of possible switching patterns over a switching period for an electric machine with two sets of phase windings (e.g., traction motor 508 of FIG. 5). A first switching pattern 850 may be defined for the first set of windings (e.g., 522 of FIG. 5). Over the switching interval 812, the first switching pattern 850 may include a number of states corresponding to the active and zero vectors. In the example, a first zero state 854 is achieved by applying $u_0$ 724 for a duration $T_7$ 862. The first switching pattern 850 then changes to a first active state 856 (achieved by applying vector $u_1$ 712) for a duration of $T_8$ 856. The first switching pattern 850 then changes to a second active state 858 (achieved by applying vector $u_2$ 714) for a duration of $T_9$ 866. The first switching pattern 850 then changes to a second zero state 860 that is achieved by applying zero vector $u_7$ for a duration of $T_{10}$ 868. Note that the sum of $T_7$ 862, $T_8$ 864, $T_9$ 866, and $T_{10}$ 868 add up to the switching interval 812.

A second switching pattern 852 may be defined for the second set of windings (e.g., 524 of FIG. 5). Over the switching interval 812, the second switching pattern 852 also includes a number of states corresponding to the active and zero vectors. In the example, a first zero state 8870 is achieved by applying vector $u_7$ 726 for the duration $T_{11}$ 876. The second switching pattern 852 then changes to a first active state 872 (achieved by applying $u_2$ 714) for a duration of $T_{12}$ 878. The duration $T_{12}$ 878 is the same as duration $T_9$ 866. The second switching pattern 852 then changes to a second active state 874 (achieved by applying $u_1$ 712) for the duration of $T_{13}$ 880. The duration $T_{13}$ 880 is the same as duration $T_8$ 864. The second switching pattern 852 does not have a second zero vector state.

One difference between the first switching pattern 850 and the second switching patter 852 is that each of the patterns utilize a different number of zero vectors within each of the switching intervals 812. For example, the first switching pattern 850 may be derived from a SVPWM strategy and the second switching pattern 852 may be derived from a DPWM strategy. Both patterns achieve the same reference vector but the power switches 302 are switched using a different sequence. The result is that the noise characteristics of each set of phase windings is different. Such operation leads to a different audible noise characteristic when compared to switching the sets of phase windings with the same switching pattern.

Note that subsequent switching intervals are processed in a similar manner. The reference vector 750 will rotate in the vector space. As the reference vector 750 rotates, different pairs of active vectors will be selected. In subsequent intervals, the switching states and corresponding durations may change as reference vector rotates.

Figure 11:
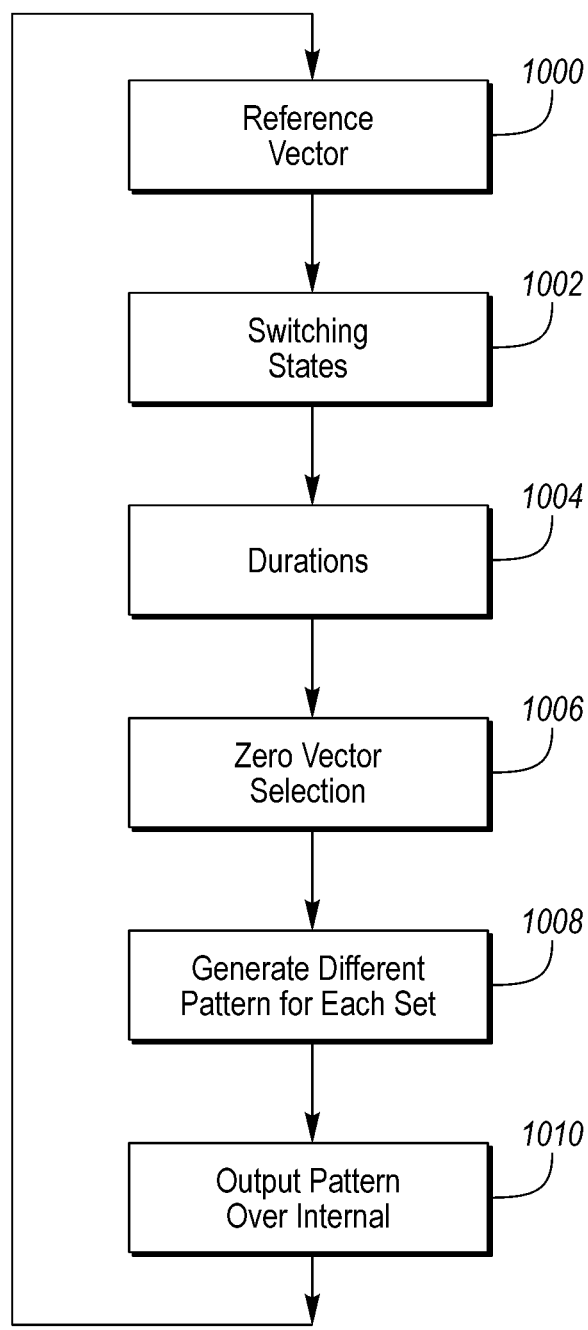
FIG. 11 is a flowchart of a possible sequence of operations for controlling multiple inverters to reduce noise.

FIG. 11 depicts a flow chart for a possible sequence of operations for controlling the electric machine having multiple sets of phase windings. At operation 1000, the reference vector may be computed. The reference vector may be computed based on a desired powertrain torque and the angular position of the electric machine. At operation 1002, switching states during the next switching interval may be determined based on the location of the reference vector in the vector space. The switching states may be selected such that the reference vector lies between the selected switching states. At operation 1004, the durations for each of the switching states may be determined. The durations may be based on the magnitude and angle of reference vector as well as the magnitude of the components along the selected vectors. At operation 1006, the zero vector states may be selected. The zero vector selection may depend on the particular strategy being implemented. For example, one of the sets may be controlled using only one of the zero vectors in each interval while another of the sets may be controlled using both zero vectors. The duration of the zero vectors may also be computed. At operation 1008, a different switching pattern may be generated for each of the sets of phase windings. That is, a different switching pattern is generated for each of the inverters that control the sets of phase windings. At operation 1010, the switching pattern is output over the interval. The power switches 302 are controlled according the sequence and timing of states that are generated in the switching pattern. The process may then be repeated at each interval.

The controller 310 may be programmed to operate the power switches 302 for each of the sets according to a switching pattern derived for each of the sets as described. The switching pattern may be updated at intervals defined by the switching frequency. To reduce noise, the controller 310 may be programmed to select switching patterns for each set of power switches 302 that are different from one another. That is, the power switches associated with each set of phase windings are controlled with a different switching pattern over each of the intervals. The switching pattern is considered different when the switching patterns utilize a different sequence during an interval defined by the switching frequency. The switching patterns are not considered different if the same sequence is shifted in time (e.g., phase shift of one pattern relative to another).

The switching pattern defines a sequence of operating states for each of the power switches corresponding to each one of the sets. The switching pattern also defines durations for each of the operating states. The switching patterns may be selected to achieve the same average current or voltage over the interval in each of the set of phase windings. The switching pattern states and durations are used to control the gate drives to the power switches to control the voltage and current of each of the sets of phase windings.

The controller 310 may be programmed to differentiate the switching patterns based on selection of the zero vectors in each of the intervals. The zero vectors correspond to those switching states in which all of the power switches are operated to couple all of the phase windings associated with a set to a common voltage terminal for a duration. One way to differentiate the switching patterns is to utilize a different zero vector for each of the sets within an interval. In addition, a different sequence of zero vectors may be used. For example, the zero vectors may be applied such that each set does not output the same zero vector at the same time. Another way to differentiate the switching patterns is to utilize a different number of zero vectors for each of the sets of phase windings. For example, one sets may use one zero vector while another set may use both zero vectors during the same interval.

A goal of the inverter and electric machine operational strategy is to minimize an amount of audible noise that is produced by the drivetrain. The audible noise emitted by the electrified powertrain may be influenced by frequency of operation of the inverter. That is, the frequency over which the PWM signals operate. In addition, the switching patterns within the intervals defined by the inverse of the frequency can also influence the audible noise. For example, operating two inverters using the exact same switching patterns can cause an additive effect to the audible noise. Both inverters may be producing the same pattern of audible noise. By operating the inverters with different switching patterns within the intervals may cause differences in the patterns of audible noise generated by the inverters. By producing different audible noise patterns, the resulting summation of the audible noise may be less pronounced or spread over a wider spectrum at lower amplitude.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an electric machine configured with at least two sets of three phase windings;
a plurality of power switches configured to selectively couple voltage terminals to each of the phase windings; and
a controller programmed to operate the power switches according to a switching pattern, for each of the sets, updated at intervals defined by a switching frequency and defined so that each of the sets achieves a same reference voltage vector using switching patterns that are different during each one of the intervals.

2. The vehicle of claim 1 wherein the switching pattern defines a sequence of operating states for each of the power switches corresponding to one of the sets.

3. The vehicle of claim 2 wherein the switching pattern further defines a duration for each of the operating states.

4. The vehicle of claim 1 wherein the switching pattern defines one or more zero states that are operating states for which the power switches corresponding to one of the sets are operated to couple all of the phase windings of the one of the sets to a common voltage terminal for a duration.

5. The vehicle of claim 4 wherein the switching patterns define different zero states during each one of the intervals.

6. The vehicle of claim 4 wherein the switching patterns define a different number of zero states during each one of the intervals.

7. The vehicle of claim 1 wherein the intervals are defined by an integer multiple of a period defined by the switching frequency.

8. A method for operating an electric machine having at least two sets of three phase windings comprising:
operating, by a controller, a plurality of power switches configured to selectively couple voltage terminals to each of the phase windings according to a switching pattern, for each of the sets, updated at intervals and defined such that the switching patterns are different and achieve a same reference voltage vector during each one of the intervals.

9. The method of claim 8 further comprising wherein the switching pattern defines one or more zero states that are operating states during which the power switches corresponding to one of the sets are operated to couple all of the phase windings of the one of the sets to a common voltage terminal for a duration.

10. The method of claim 9 wherein the switching patterns define different zero states during each one of the intervals.

11. The method of claim 9 wherein the switching patterns define a different number of zero states during each one of the intervals.

12. The method of claim 8 further comprising updating, by the controller, the switching patterns by an integer multiple of a period defined by a switching frequency.

13. An electrified powertrain comprising;
an electric machine configured with at least two sets of phase windings;
a plurality of power switches configured to selectively couple voltage terminals to each of the phase windings; and
a controller programmed to operate the power switches during an interval according to a sequence of space vector modulation states, for each of the sets, that defines a different zero vector pattern for each of the sets during the interval.

14. The electrified powertrain of claim 13 wherein the zero vector pattern defines one or more zero vectors in which all of the power switches associated with one of the sets are operated to couple all associated phase windings to a common one of the voltage terminals.

15. The electrified powertrain of claim 13 wherein the controller is further programmed to generate the zero vector pattern for each of the sequences such that each of the sequences defines a different number of zero vectors during the interval.

16. The electrified powertrain of claim 13 wherein the controller is further programmed to generate the zero vector pattern for each of the sequences such that no two of the sequences define a zero vector pattern outputting the same zero vector at the same time during the interval.

17. The electrified powertrain of claim 13 wherein the interval corresponds to a period associated with a switching frequency of the power switches.

18. The electrified powertrain of claim 17 wherein the controller is further programmed to update the sequences at a rate corresponding to an integer multiple of the period.

19. The electrified powertrain of claim 13 wherein the controller is further programmed to generate the sequences to achieve a same average current over the interval.

* * * * *